ns Linear Integrated Circuits, RV4145 Low Power Ground Fault Interrupter pp. 2-7 Aug. 1990.

United States Patent [19]
MacKenzie et al.

[11] Patent Number: 5,224,006
[45] Date of Patent: Jun. 29, 1993

[54] ELECTRONIC CIRCUIT BREAKER WITH PROTECTION AGAINST SPUTTERING ARC FAULTS AND GROUND FAULTS

[75] Inventors: Raymond W. MacKenzie, Baldwin Boro; Joseph C. Engel, Monroeville Boro, both of Pa.

[73] Assignee: Westinghouse Electric Corp., Pittsburgh, Pa.

[21] Appl. No.: 765,759

[22] Filed: Sep. 26, 1991

[51] Int. Cl.$^5$ .......................... H02H 3/32; H02H 3/26
[52] U.S. Cl. ........................................ 361/45; 361/79; 361/95
[58] Field of Search ................... 361/42, 45, 49, 178, 361/87, 79, 88, 93, 94, 95, 80

[56] References Cited
U.S. PATENT DOCUMENTS

| | | | |
|---|---|---|---|
| 3,858,130 | 12/1974 | Misencik | 335/18 |
| 4,081,852 | 3/1978 | Coley et al. | 361/45 |
| 4,251,846 | 2/1981 | Pearson et al. | 361/80 |
| 4,264,856 | 4/1981 | Frierdich et al. | 361/20 |
| 4,707,759 | 11/1987 | Bodkin | 361/48 |
| 4,893,102 | 1/1990 | Bauer | 335/132 |
| 4,949,214 | 8/1990 | Spencer | 361/95 |

OTHER PUBLICATIONS
Raytheon Brochure, Preliminary Product Specifica-

Primary Examiner—A. D. Pellinen
Assistant Examiner—Ronald W. Leja
Attorney, Agent, or Firm—M. J. Moran

[57] ABSTRACT

A circuit breaker bandwidth limits a sensed rate of change of current, di/dt, in the neutral conductor of a protected electrical system and fullwave rectifies the bandwidth limited di/dt signal for comparison with an instantaneous trip reference signal. The bandwidth is selected to provide a selected relative sensitivity of the instantaneous trip to sinusoidal currents associated with overcurrent faults and step currents associated with sputtering arc faults. The rectified bandwidth limited di/dt signal is also filtered and delayed for comparison with a delayed trip reference signal. The time constant for the filter is selected to provide a selected relative sensitivity of the delayed trip to overcurrent faults and sputtering arc faults. A low mu sensing coil used to generate the di/dt signal can also serve as the neutral current sensing coil of a dormant oscillator ground fault protection system.

12 Claims, 3 Drawing Sheets

ELECTRONIC CIRCUIT BREAKER WITH PROTECTION AGAINST SPUTTERING ARC FAULTS AND GROUND FAULTS

BACKGROUND OF THE INVENTION

1. Field of the Invention

This invention relates to circuit breakers and more particularly to an electronic circuit breaker which responds to sputtering arc faults as well as overcurrent faults and which can be combined with a ground fault detector. The invention further relates to the shared use of a di/dt current sensor by the line-to-neutral fault detector and the ground fault detector.

2. Background Information

Conventional residential circuit breakers have a thermal trip device which responds to persistent overcurrents of moderate magnitude to provide a delayed trip, and a magnetic trip device which responds instantaneously to overcurrents of large magnitude. Thus, the fault current must reach a predetermined magnitude, for example ten times rated current for the instantaneous trip to occur, or the overcurrent must sustain a predetermined average value over a given time interval to implement the delayed trip. There is a type of fault, however, which may not produce either the peak magnitude required for the instantaneous magnetic trip or the sustained average overcurrent necessary for the delayed trip, yet may pose a fire hazard. This is the intermittent or sputtering arc-type of fault. Such a fault can occur, for instance, between two conductors that are in close proximity, but not touching so that an arc is struck between the conductors. This arc can produce a temperature high enough to melt the copper in the conductor. The melted droplets of copper can ignite flammable material in the vicinity. The resistance of the wire may be high enough to limit the peak current and the ac current cyclically passes through zero to extinguish the arc so that the average current is low. Thus, the conventional circuit breaker does not respond to the fault, although a hazard exists. This is especially true in the case of a stranded wire extension cord where an individual strand can be melted at a relatively low fault current.

As sufficient voltage is required to strike the arc of a sputtering arc fault, this type of fault typically occurs near the peak of the ac voltage waveform thereby resulting in a step increase in current. Switching of some residential loads also produces step increases in current. For instance, an iron which is turned on at the peak of the voltage waveform results in a step increase in current; however, the magnitude of the step is less than the rated current of the circuit breaker. In addition, inrush currents, such as those produced by starting of a motor, have a high initial value, but do not have a high rate of change of current, di/dt, as this is limited by the motor inductance.

Ground fault protection circuits provided in a separate receptacle or as part of a circuit breaker are known. One type of ground fault detector, used with a grounded neutral electrical system and known as the dormant oscillator detector, includes one sense coil on both the line and neutral conductors which detects line-to-ground faults and a second sense coil on the neutral conductor alone which senses neutral to ground faults by generating an oscillation when coupled to the first coil through the neutral-to-ground fault.

There remains a need for a circuit breaker that can distinguish between sputtering arc type faults and inrush currents.

There is also a need for such a circuit breaker which is as compact as possible.

There is an additional need for such a circuit breaker which can provide separate sensitivities to overcurrent line-to-neutral faults and sputtering arc type faults.

There is also a need for providing line-to-neutral and ground fault protection in a compact economical unit.

SUMMARY OF THE INVENTION

These and other needs are satisfied by the invention which is directed to a circuit breaker which monitors the rate of change of current, di/dt, in the protected circuit. As the rate of change of a step function is very large, the di/dt signal is bandwidth limited. The selection of the bandwidth provides control of relative sensitivity of the circuit breaker to the sinusoidal overcurrents produced by overcurrent faults and step currents associated with sputtering arc type faults. Preferably, the bandwidth limited rate of change of current signal is full wave rectified prior to comparison with a trip reference signal so that it might respond quickly to the first arcing occurrence, as well as responding to faults which are unipolar, either due to the presence of a diode in the circuit, or merely due to random chance.

The circuit breaker preferably also includes a delayed trip feature. The bandwidth limited rate of change signal is filtered prior to application to a delay circuit and comparison to a second reference signal. The filter time constant can be selected between that of a peak detector and an average detector to adjust the relative sensitivity of the delayed trip to the sinusoidal overcurrents associated with overcurrent faults and the step currents characteristic of sputtering arc-type faults.

As another aspect of the invention, the circuit breaker which provides line-to-neutral fault protection is combined with a ground fault detector. The ground fault detector, which is preferably of the dormant oscillator type, shares a common di/dt sensing coil on the neutral conductor with the line-to-neutral fault detector of the circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
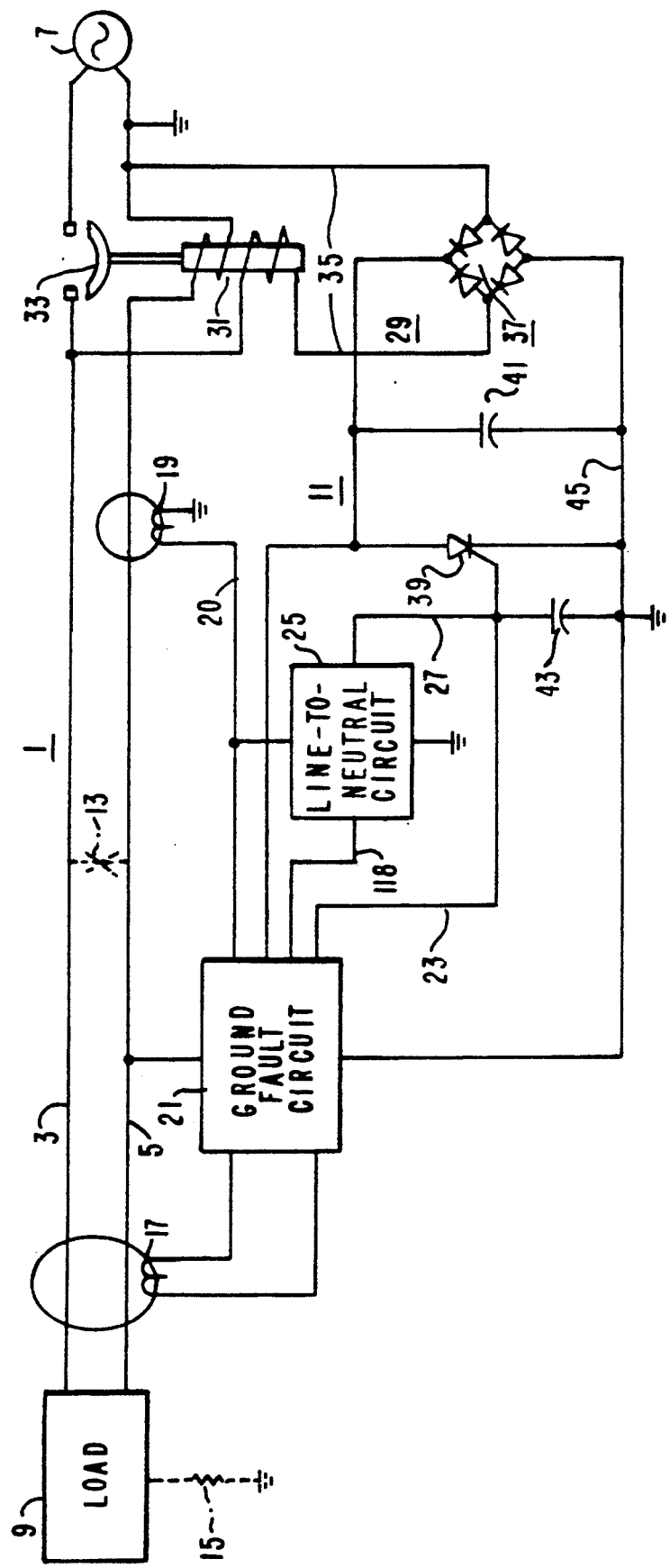
FIG. 1 is a schematic diagram of an electrical system protected by a circuit breaker in accordance with the invention.

Referring to FIG. 1, an electrical system 1 comprising a line conductor 3 and a neutral conductor 5 provides 120 volts ac, 60 Hz electric power from a source 7 to a load 9. The neutral conductor 5 is grounded.

A circuit breaker 11 protects the electrical system from line-to-neutral faults, such as indicated at 13, and also ground faults, such as indicated at 15. The ground fault 15 could occur between one of the conductors and ground as well as the load to ground as shown. The circuit breaker 11 includes a first current sensing coil 17 having a core which encircles both conductors 3 and 5. Normally, the currents flowing in opposite directions in the line conductor 3 and neutral conductor 5 balance each other and no output signal is generated by the coil 17. However, when there is a ground fault 15 between one of the conductors and ground, there will be an imbalance in the currents through the two conductors and a signal will be generated by the coil 17. The circuit breaker 11 also includes a second current sensing coil 19 having a core which encircles only the neutral conductor 5.

The circuit breaker 11 further includes a ground fault detector circuit 21 which utilizes the signals generated by both of the current sensing coils 17 and 19. As will be discussed in detail below, the ground fault detector circuit 21 generates a trip signal on lead 23 when a ground fault is detected.

The circuit breaker 11 also includes a line-to-neutral fault detector circuit 25 which uses the signal generated by the current sensing coil 19 on lead 20 to detect line-to-neutral faults. This detector circuit 25 generates a trip signal on the lead 27 when a line-to-neutral fault is detected. As will be discussed in connection with a detailed description of this circuit, a trip signal is generated on the lead 27 for sputtering arc faults as well as overcurrent line-to-neutral faults.

The trip signals generated on the leads 23 and 27 control a trip circuit 29 which includes a trip solenoid 31. When energized, the trip solenoid 31 opens contacts 33 which interrupt the flow of current in the line conductor 3. Once tripped, the contacts 33 must be reset to connect the line conductor 3 to the source 7. The trip solenoid 31 is powered by current drawn from the electrical system 1 through the leads 35 and full wave bridge circuit 37. The dc terminals of the bridge 37 are connected to the anode and cathode of a silicon controlled rectifier (SCR) 39. The gate electrode of the SCR 39 is connected the leads 23 and 27. A shunt capacitor 41 protects the SCR 39 from high frequency noise. A capacitor 43 protects the gate of the SCR 39. With the SCR 39 turned off, no current flows through the bridge 37 and the trip solenoid 31 remains deenergized. The charging current drawn by the capacitor 41 is insufficient to actuate the solenoid 31. When a trip signal is generated, either on the lead 23 by the ground fault detector circuit 21, or on lead 27 by the line-to-neutral fault detector circuit 25, the SCR 39 is turned on. This provides a path for current to flow through the solenoid 31 which is energized to open the contacts 33. Opening of the contacts 33 deenergizes the bridge 37 and commutates the SCR 39 off.

Figure 2:
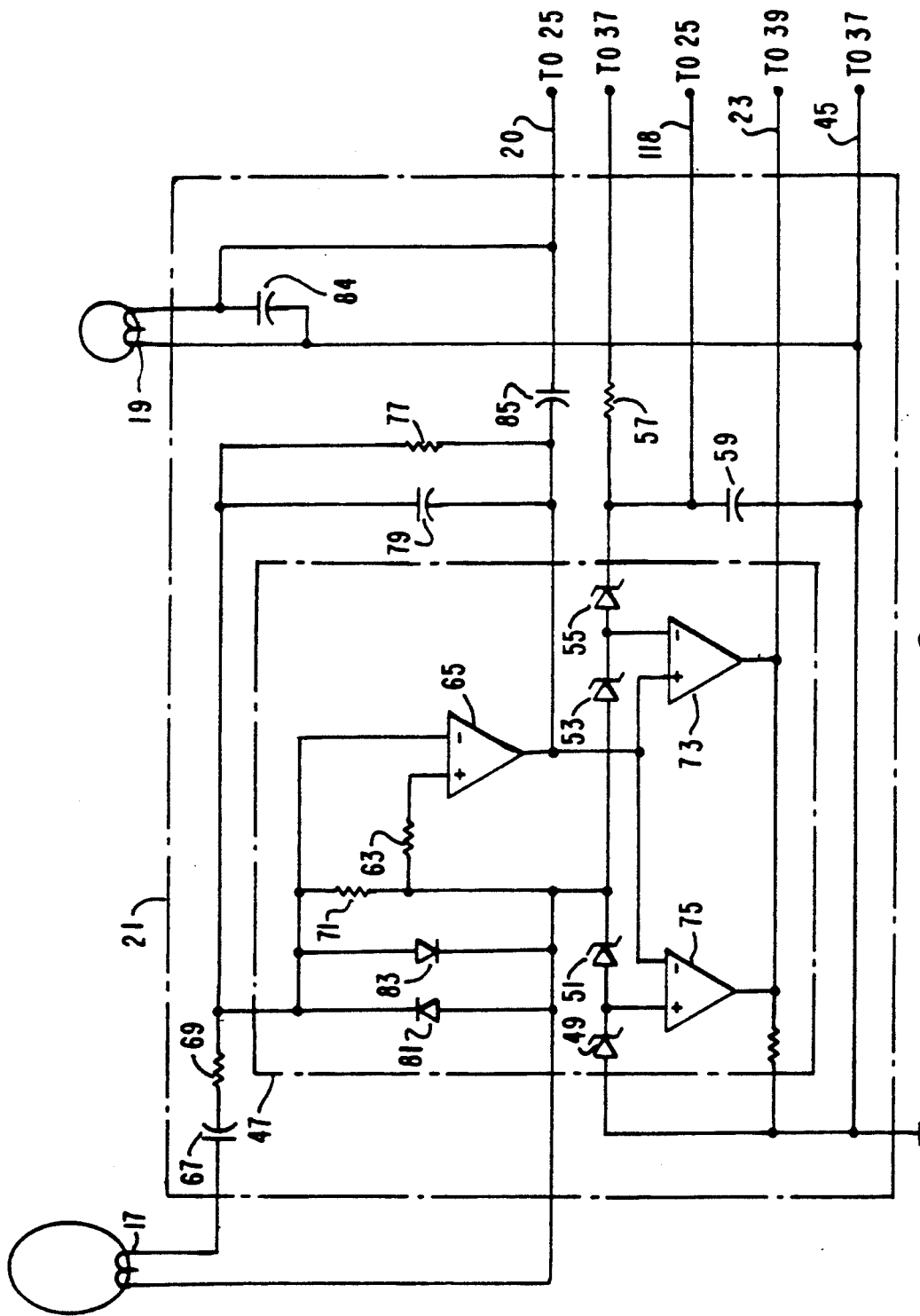
FIG. 2 is a schematic diagram of a ground fault protection circuit which forms a part of the circuit breaker of FIG. 1.

The ground fault detection system is the well known dormant oscillator type which utilizes both sensing coils 17 and 19 and the ground fault detector circuit 21. Such a dormant oscillator ground fault detector system is commercially available, for instance from Raytheon Corporation. A schematic diagram of the ground fault detector circuit 21 is illustrated in FIG. 2. The ground fault detector circuit 21 includes an integrated circuit chip 47. A string of 6.5 volt zener diodes 49, 51, 53 and 55 on the chip 47 form a 26 volt shunt regulator which is fed by the bridge circuit 37 through a current limiting resistor 57. Resistor 69 lowers the Q of the series resonant circuit formed by coil 17 and capacitor 67. A resistor 71 facilitates testing of the chip.

A 13 volt reference generated at the midpoint of the zener diode string is applied through an input resistor 63 to the non-inverting input of an op amp 65. As mentioned previously, the current sensing coil 17 produces a signal when there is an imbalance in the currents flowing in the line conductor 3 and neutral conductor 5 caused by a fault between one of these conductors and ground. The signal generated by the sensing coil 17 is ac coupled through capacitor 67 and resistor 69 to the inverting input of the op amp 65. The output of the op amp 65 is applied to the non-inverting input of a comparator 73 for comparison with an 19.5 volt reference, and is applied to the non-inverting input of a comparator 75 for comparison with a 6.5 volt reference. The gain of the op amp 65 is set by the feedback resistor 77. If the signal generated by the coil 17 exceeds a specified value set by the feedback resistor 77 of op amp 65, the output of the comparator 73 goes high to fire the SCR 39 which energizes the trip coil 31. If the fault occurs on the negative half cycle, the output of the comparator 75 goes high to trip the circuit breaker. A capacitor 79 forms with the resistor 77 a noise filter. The back to back diodes 81 and 83 protect the integrated circuit chip 47 from spikes.

Neutral-to-ground faults couple the current sensing coils 17 and 19 to form a feedback loop around the op amp 65 which causes the op amp 65 to oscillate. The frequency of this oscillation can be set by the selection of capacitors 84 and 85 as well as the parameters of the coils 17 and 19. When the magnitude of the oscillations exceeds the thresholds of either of the comparators 73 or 75, the SCR 39 is fired to trip the circuit breaker.

Figure 3:
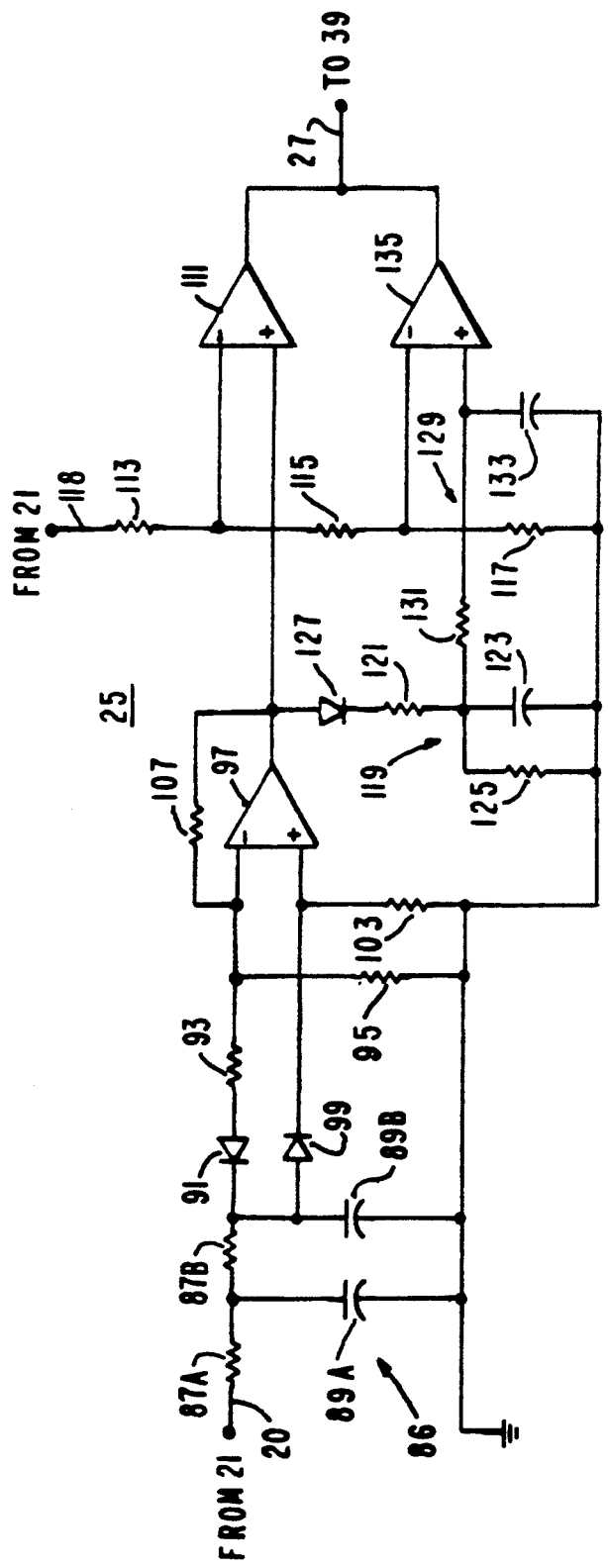
FIG. 3 is a schematic diagram of the line-to-neutral fault detector which forms a part of the circuit breaker of FIG. 1.

A schematic of the line-to-neutral fault detector circuit 25 is shown in FIG. 3. This circuit requires a rate of change of current signal, di/dt, in order to respond to sputtering arc faults as well as overcurrent line-to-neutral faults. As the ground fault detector circuit 21 requires a coil on the neutral conductor 5 for detecting a ground-to-neutral condition, and the line-to-neutral fault detector 25 requires a coil on either conductor for sensing current, the same coil may be used for both purposes if it is placed on the neutral conductor, and it otherwise meets the requirements of both circuits. (The use of neutral conductor sensing is restricted to a single pole circuit breaker.) Hence, the ground fault detector circuit 21 and the line-to-neutral fault detector circuit 25 share the coil 19 on the neutral conductor 5. The di/dt sensing function used by the line-to-neutral fault detector circuit 25 requires a core in the sensing coil 19 which does not saturate at the current level required to produce an instantaneous trip. The ground fault detector circuit requirement is less severe. Therefore, the core of the coil 19 must be chosen to suit the di/dt sensing function. A suitable material is powdered iron which has a low mu and a high flux saturation level. The winding of the coil 19 for the ground fault detection circuit 21 is generally required to resonate at a few kHz, with a reasonably sized capacitor. The number of turns on the coil used determines the di/dt sensitivity, but the gain may be easily, altered to compensate. Therefore, the winding of the coil 19 should be optimized for the grounded neutral detection function. The two circuits must be connected to the common coil 19 in such a manner that they do not degrade the operation of the other circuit. If the line-to-neutral fault detector circuit 25 has a high input impedance, it will not degrade the operation of the dormant oscillator used for grounded neutral detection. If the tuned circuit used for the grounded neutral detection is resonant above the pass band of the line-to-neutral fault detection circuit 25, it should not degrade its operation.

As mentioned previously, the function of the line-to-neutral fault detection circuit 25 is to respond to both the sinusoidal currents of overcurrent line-to-neutral faults, and the step currents generated by sputtering arc faults. Discrimination between the two types of fault currents is required, as the circuit must respond to the lower magnitude of the sputtering arc fault currents without tripping on sinusoidal currents of the same magnitude.

The di/dt signal will have very large spikes for the step currents of a sputtering arc fault. In order, to attenuate the spikes and to regulate the relative sensitivity of the circuit to the sinusoidal currents of overcurrent line-to-neutral faults and the step functions of sputtering arc faults, the di/dt signal received from the coil 19 is bandwidth limited by bandwidth limiting low-pass-filter 86 formed by the resistors 87A and 87B and the capacitors 89A and 89B. The bandwidth limited di/dt signal is full wave rectified by application of the signal through the series connected diode 91 and the resistor 93 to the inverting input of an op amp 97. The bandwidth limited di/dt signal is simultaneously applied through oppositely poled diode 99 to the non-inverting input of the op amp 97. The non-inverting input of the op amp is connected to ground through the resistor 103, which is made equal in value to the resistor 93, in order to maintain constant loading of the filter on both positive and negative half cycles. Thus, for negative going input signals, the gain of the circuit is determined by the ratio of the resistors 93 and 107, while for positive going input signals the gain is 1 plus the ratio of the resistors 95 and 107.

The full wave rectified, bandwidth limited di/dt signal generated by the op amp 97 is applied to the non-inverting input of a comparator 111 for comparison with a first reference signal applied to the non-inverting input of comparator 111. This first reference signal is generated from a voltage divider formed by the resistors 113, 115 and 117 fed over lead 118 by the 26 volt regulated voltage generated by the shunt regulator in the ground fault detection circuit 21. The comparator 111 generates a trip signal on the lead 27 which fires the SCR 39 when the instantaneous value of the bandwidth limited di/dt signal exceeds the threshold value. The relative sensitivity of the instantaneous trip to overcurrent line-to-neutral faults and sputtering arc faults is set by the bandwidth of the bandwidth limiting filter 86. The bandwidth limited signal is full wave rectified in order that the circuit breaker might respond quickly to the first arcing occurrence, regardless of polarity, as well as ensuring that faults of only one polarity are detected.

The line-to-neutral fault detector circuit 25 also has a delayed trip feature. Both overcurrent line-to-neutral and sputtering arc faults having lower average currents than those required to generate the instantaneous trip may persist for an extended period of time which could pose a hazard. For the delayed trip function, the full wave rectified bandwidth limited di/dt signal from the op amp 97 is applied to a detector/filter circuit 119. This circuit employs the diode 127, the resistors 121 and 125, and the capacitor 123. The charging time constant is determined by the values of the resistor 121 and the capacitor 123, while the discharge time constant is determined by the values of the capacitor 123 and the resistor 125. The charging time constant of the filter may be selected to adjust the relative sensitivity of the time delayed trip to overcurrent line-to-neutral faults and sputtering arc faults. With a short time constant, the detector 119 acts as a peak detector which is more sensitive to sputtering arc-type faults. With a longer time constant, the detector is an average current detector and is more sensitive to the sinusoidal waveform of overcurrent line-to-neutral faults. The output of the detector 119 which appears across the capacitor 123 is applied to a time delay circuit 129 formed by the resistor 131 and capacitor 133. The time delayed output of the detector 119 is applied to the non-inverting input of a comparator 135 where it is compared with a second reference voltage produced by the voltage divider formed by the resistors 113, 115 and 117. This second reference voltage represents a lower magnitude of overcurrent for the delayed trip than the overcurrent required to produce the instantaneous trip. When the delayed signal exceeds the reference value, the comparator 135 generates the trip signal on lead 27 for firing the SCR 39.

Returning to FIG. 1, it can be seen that if there is a low resistance line-to-neutral fault, such as a bolted fault near the circuit breaker contacts 33, there will be insufficient voltage across the bridge circuit 37 to power the circuit breaker. To assure that the breaker will respond to such a condition, either the neutral conductor 5 or the line conductor 3 can be overwound on the trip solenoid 31, so that the high current produced by such a low resistance fault will open the circuit breaker contacts 33. Alternatively, a conventional magnetic trip means may be employed.

The present invention provides an electronic circuit breaker with combined line-to-neutral, including sputtering arc, fault detection and ground fault protection. Sharing of a current sensing coil by the line-to-neutral fault detector and the ground fault detector reduces the size and cost of the unit. The cost is further reduced by the fact that a low mu di/dt sensing coil can be used to perform both functions. The circuit breaker, in accordance with the invention, also provides for control of the sensitivity to overcurrent faults and sputtering arc faults, both for instantaneous trips and delayed trips.

The apparatus of the present invention may be incorporated into a circuit breaker of the type disclosed in U.S. Pat. No. 3,858,130 which is hereby incorporated by reference.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for protecting an electrical system having a line conductor and a grounded neutral conductor, said apparatus comprising:

common sensing means sensing current in said neutral conductor wherein said common sensing means comprises di/dt sensing means generating a di/dt signal representative of a rate of change of current in said grounded neutral conductor, ground fault detector means responsive to current in said neutral conductor as sensed by said common sensing means to generate a trip signal in response to a ground fault;

line-to-neutral fault detector means responsive to current in said neutral conductor as sensed by said common sensing means to generate a trip signal in response to line-to-neutral faults in said electric system; and trip means responsive to said trip signals to interrupt current flow in said electrical system.

2. The apparatus of claim 1 wherein said ground fault detector means is a dormant oscillator ground fault detector including a second sensing means sensing a difference in current in said line conductor and neutral conductor.

3. The apparatus of claim 1 wherein said line-to-neutral detector means includes bandwidth limiting means bandwidth limiting said di/dt signal to generate a bandwidth limited di/dt signal and comparator means comparing said bandwidth limited di/dt signal to a first threshold signal and generating said trip signal when said bandwidth limited di/dt signal exceeds a first threshold, said bandwidth limiting means having a bandwidth selected to provide a predetermined relative sensitivity between overcurrent line-to-neutral faults and sputtering arc line-to-neutral faults.

4. The apparatus of claim 3 including delayed trip signal generating means responsive to said bandwidth limited di/dt signal to generate a delayed trip signal in response to a persistent bandwidth limited di/dt signal of a preselected average value and wherein said trip means is also responsive to said delayed trip signal to interrupt current flow in said electrical system 5. The apparatus of claim 3 wherein said ground fault detector means is a dormant oscillator ground fault detector which resonates at a predetermined resonant frequency in response to a ground fault and wherein said bandwidth limiting means in said line-to-neutral fault detector means has a pass band which does not include the resonant frequency of said dormant oscillator ground fault detector.

6. A circuit breaker for protecting an electrical system from both overcurrent faults having substantially sinusoidal waveforms and sputtering arc faults having substantially step waveforms, said circuit breaker comprising:

current sensing means sensing current flowing in said electrical system;

trip signal generating means responsive to current sensed by said current sensing means to generate a trip signal in response to current of a first magnitude with a substantially sinusoidal waveform and in response to current of a second magnitude with a substantially step waveform; and trip means responsive to said trip signal to interrupt current flow in said electrical system.

7. The circuit breaker of claim 6 wherein said trip signal generating means includes means generating a trip signal in response to current with a substantially sinusoidal waveform having a third magnitude which is less than said first magnitude and which persists for a selected time interval, and in response to current with a substantially step waveform having a fourth magnitude which is less than said second magnitude which persists for a selected time interval.

8. A circuit breaker for protecting an electrical system from both overcurrent faults and sputtering arc faults, said circuit breaker comprising:

sensing means generating a di/dt signal representative of the rate of change of current in said electrical system;

bandwidth limiting means bandwidth limiting said di/dt signal to generate a bandwidth limited di/dt signal;

comparison means comparing said bandwidth limited di/dt signal to an instantaneous trip reference signal and generating a trip signal when said bandwidth limited di/dt signal exceeds said instantaneous trip reference signal; and trip means interrupting current flow in said electrical system in response to said trip signal.

9. The circuit breaker of claim 8 wherein said bandwidth limiting means has means of determining a bandwidth of said bandwidth limited di/dt signal selected to provide a selected relative sensitivity of said comparison means to overcurrent faults and sputtering arc faults.

10. The circuit breaker of claim 9 including full wave rectifying means full wave rectifying said bandwidth limited di/dt signal and wherein said comparison means compares said full wave rectified bandwidth limited di/dt signal to said reference signal.

11. The circuit breaker of claim 9 including delay means generating a delayed bandwidth limited di/dt signal from said bandwidth limited di/dt signal and additional comparison means comparing said delayed bandwidth limited di/dt signal to a delayed trip reference signal, and generating a trip signal when said delayed bandwidth limited di/dt signal exceeds said delayed trip reference signal.

12. The circuit breaker of claim 11 including filter means filtering said bandwidth limited di/dt signal used by said delay means in generating said delayed bandwidth limited di/dt signal, said filter means being selected to provide a selected relative sensitivity of said additional comparison means in generating a trip signal in response to persistent overcurrent fault currents and sputtering arc fault currents.

* * * * *